United States Patent
Rickard et al.

(10) Patent No.: US 7,474,756 B2
(45) Date of Patent: Jan. 6, 2009

(54) SYSTEM AND METHOD FOR NON-SQUARE BLIND SOURCE SEPARATION UNDER COHERENT NOISE BY BEAMFORMING AND TIME-FREQUENCY MASKING

(75) Inventors: Scott Rickard, Princeton, NJ (US); Radu Victor Balan, West Windsor, NJ (US); Justinian Rosca, West Windsor, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 1168 days.

(21) Appl. No.: 10/737,444

(22) Filed: Dec. 16, 2003

(65) Prior Publication Data

US 2004/0158821 A1    Aug. 12, 2004

Related U.S. Application Data

(60) Provisional application No. 60/434,371, filed on Dec. 18, 2002.

(51) Int. Cl.
*H04B 15/00* (2006.01)

(52) U.S. Cl. .................. 381/94.7; 381/94.1; 702/194

(58) Field of Classification Search .............. 704/233; 381/94.1, 94.2, 94.3, 94.4, 94.7; 702/194
See application file for complete search history.

(56) References Cited

U.S. PATENT DOCUMENTS

| | | | | |
|---|---|---|---|---|
| 5,675,659 A | * | 10/1997 | Torkkola | 381/94.1 |
| 6,343,268 B1 | * | 1/2002 | Balan et al. | 704/228 |
| 6,898,612 B1 | * | 5/2005 | Parra et al. | 708/405 |
| 7,085,711 B2 | * | 8/2006 | Kadambe | 704/201 |
| 2002/0051500 A1 | * | 5/2002 | Gustafsson | 375/295 |

* cited by examiner

*Primary Examiner*—Vivian Chin
*Assistant Examiner*—Kile Blair
(74) *Attorney, Agent, or Firm*—Donald B. Paschburg; F. Chau & Associates, LLC

(57) ABSTRACT

A system and method for non-square blind source separation (BSS) under coherent noise. The system and method for non-square BSS estimates the mixing parameters of a mixed source signal and filters the estimated mixing parameters so that output noise is reduced and the mixed source signal is separated from the noise. The filtering is accomplished by a linear filter that performs a beamforming for reducing the noise and another linear filter that solves a source separation problem by selecting time-frequency points where, according to a W-disjoint orthogonality assumption, only one source is active.

25 Claims, 5 Drawing Sheets

SYSTEM AND METHOD FOR NON-SQUARE BLIND SOURCE SEPARATION UNDER COHERENT NOISE BY BEAMFORMING AND TIME-FREQUENCY MASKING

CROSS-REFERENCE TO RELATED APPLICATIONS

This application claims the benefit of U.S. Provisional Application No. 60/434,371, filed Dec. 18, 2002.

BACKGROUND OF THE INVENTION

1. Technical Field

The present invention relates to blind source separation (BSS) and more particularly, to non-square BSS under coherent noise.

2. Discussion of the Related Art

Over the past several years, a variety of BSS techniques have been introduced to separate independent audio signal sources from an array of sensors. The BSS techniques that have been developed sometimes focus on real audio and noisy data. Most techniques, however, focus on the "square" case of source separation (i.e., when there is an equal number of sources and sensors), while some focus on the "non-square" or degenerate case of source separation (i.e., when there is an un-equal number of sources and sensors). With regard to the "non-square" case, claims of generalization have been made; however, these claims have not clearly indicated how they would scale, neither from an algorithmic perspective nor in terms of computational properties.

Certain BSS techniques have used a maximum likelihood (ML) estimator to estimate the mixing parameters of the signal sources. For example, one known technique derived the ML estimator of the mixing parameters in the presence of Gaussian sensor noise. In this technique, however, the noise element represented a technicality in that it was considered in the limit zero in order to be able to determine parameter update equations. In another known technique, the ML estimators were derived from noisy data that did not come from an isotropic noise field.

SUMMARY OF THE INVENTION

The present invention overcomes the foregoing and other problems encountered in the known teachings by providing a system and method for non-square blind source separation (BSS) under coherent noise.

In one embodiment of the present invention, a method for non-square BSS under coherent noise comprises the steps of estimating mixing parameters of a mixed source signal, first filtering the estimated mixing parameters so that output noise is reduced, and second filtering the estimated mixing parameters so that the mixed source signal is separated from the output noise.

In another embodiment of the present invention, a system for non-square BSS under coherent noise comprises an estimating means for estimating mixing parameters of a mixed source signal, a first filter for filtering the estimated mixing parameters so that output noise is reduced, and a second filter for filtering the estimated mixing parameters so that the mixed source signal is separated from the output noise.

In yet another embodiment of the present invention, a computer program product comprising a computer useable medium having computer program logic recorded thereon for non-square BSS under coherent noise, the computer program logic comprises program code for estimating mixing parameters of a mixed source signal, program code for first filtering the estimated mixing parameters so that output noise is reduced, and program code for second filtering the estimated mixing parameters so that the mixed source signal is separated from the output noise.

In another embodiment of the present invention, a system for non-square BSS under coherent noise comprises a means for estimating mixing parameters of a mixed source signal, a first means for filtering the estimated mixing parameters to reduce output noise, and a second means for filtering the estimated mixing parameters to separate the mixed source signal from the noise.

In yet another embodiment of the present invention, a method for non-square BSS under coherent noise comprises the steps of initializing mixing parameters with random values, setting a source signal and alignment value to zero, choosing a stopping threshold, computing an optimal partition and selection map, computing the mixing parameters, computing an alignment criterion, first filtering the mixing parameters so that output noise is reduced, second filtering the mixing parameters so that a mixed source signal is separated from the output noise, converting filtered data from a time-frequency domain to a time-domain, and outputting the converted data.

The foregoing advantages and features are of representative embodiments and are presented to assist in understanding the invention. It should be understood that they are not intended to be considered limitations on the invention as defined by the claims, or limitations on equivalents to the claims. Therefore, this summary of features and advantages should not be considered dispositive in determining equivalents. Additional features and advantages of the invention will become apparent in the following description, from the drawings and from the claims.

DETAILED DESCRIPTION OF EXEMPLARY EMBODIMENTS

Figure 1:
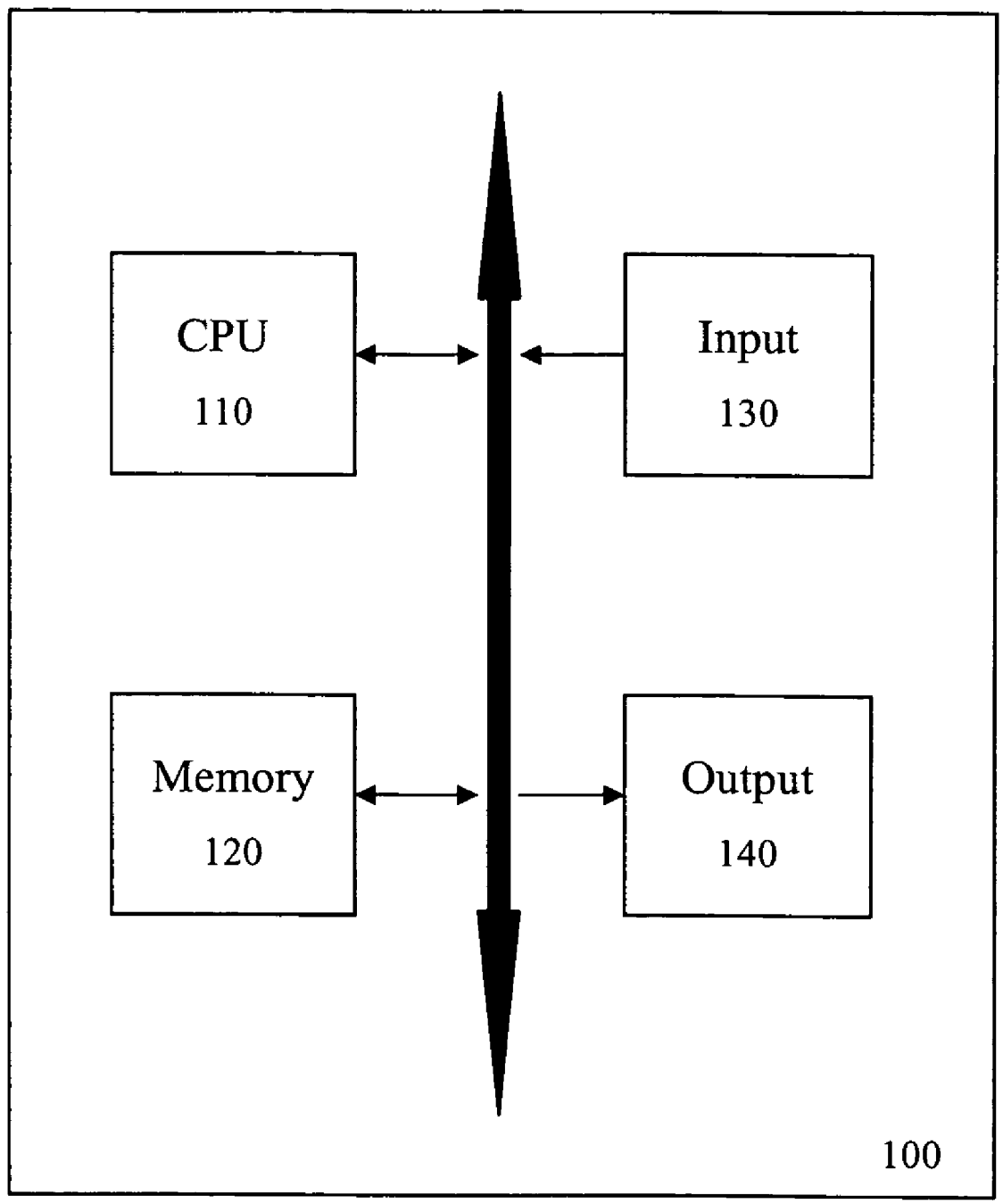
FIG. 1 is a block diagram of a computer system to which the present invention is applied according to an exemplary embodiment thereof.

FIG. 1 is a block diagram of a computer system 100 to which the present invention is applied according to an exemplary embodiment thereof. As shown in FIG. 1, the computer system 100 includes, inter alia, a central processing unit (CPU) 110, a memory 120, an input 130 and an output 140 operatively connected to each other via an input/output interface 150.

The memory 120 can include random access memory (RAM), read only memory (ROM), disk drive, tape drive, etc., or a combination thereof. The ROM functions as a program memory for storing a program executed in the CPU 110.

The RAM functions as a data memory that stores data used during the execution of the program in the CPU 110 and is used as a work area. The input 130 is constituted by a keyboard, mouse, etc. and the output 140 is constituted by a liquid crystal display (LCD), a cathode ray tube (CRT) display, a printer, etc.

Before describing the maximum likelihood (ML) algorithm for use with the present invention, its derivation process will be discussed, infra.

Mixing Model and Signal Assumption

1. The Mixing Model

First, the measurements of L source signals by an equispaced linear array of D sensors under far-field assumption where only the direct path is present are considered. In this case, without loss of generality, one can absorb the attenuation and delay parameters of the first mixture $x_1(t)$, into the definition of the sources:

$$x_1(t) = \sum_{l=1}^{L} s_l(t) + n_1(t) \quad (1)$$

$$x_k(t) = \sum_{l=1}^{L} (1 - a_{k,l}) s_l(t - \tau_{k,l}) + n_k(t), \; 2 \leq k \leq D$$

where $n_1, \ldots n_D$ are the sensor noises, and $(\alpha_{d,l}; \tau_{d,l})$ are the attenuation and delay parameters of source l to sensor d. For the far-field model and equispaced sensor array, the attenuations $\alpha_{d,l}$ and delays $\tau_{d,l}$ are linearly distributed across the sensors (i.e., with respect to index d). Thus, one can define the average attenuation $\alpha_l$, and delay $\tau_l$, so that $$\alpha_{d,l} = (d-1)\alpha_l, \tau_{d,l} = (d-1)\tau_l, 1 \leq d \leq D, 1 \leq l \leq L \quad (2)$$

$\Delta$ is used to denote the maximal possible delay between adjacent sensors, and thus $|\tau_l| \leq \Delta, \forall l$.

The short-time Fourier transform of signals $x_d(t)$, $s_l(t)$, and $n_d(t)$, are denoted by $X_d(k, \omega)$, $S_l(k, \omega))$, $N_d(k, \omega)$ respectively, with respect to a window $W(t)$, where k is the frame index, and $\omega$ the frequency index. The mixing model (equation (1)) turns into $$X_d(k, \omega) = \sum_{l=1}^{L} (1 - (d-1)a_l) e^{-i\omega(d-1)\tau_l} S_l(k, \omega) + N_d(k, \omega) \quad (3)$$

or, more compactly, $$X(k, \omega) = \sum_{l=1}^{L} Z_l(\omega) S_l(k, \omega) + N(k, \omega) \quad (4)$$

with $$Z_l(\omega) = [1 (1-\alpha_l)e^{-i\omega\tau l} \ldots (1-(D-1)\alpha_l)e^{-i\omega(D-1)\tau_l}]^T \quad (5)$$

and X, N the D-vectors of measurements, respectively noises. When no danger of confusion arises, the arguments k, $\omega$ are dropped.

Assume the noise is Gaussian distributed with a covariance matrix of the form $$R_n = \sigma^2 \Gamma_n \quad (6)$$

where $\sigma^2$ is the average noise field spectral power, and $\Gamma_n$ the coherence matrix. The uncorrelated noise field is characterized by the identity matrix, $$\Gamma_n = I_D \quad (7)$$

whereas the isotropic, diffuse noise field has the coherence matrix given by (equation (5))

$$\begin{bmatrix} 1 & \text{sinc}(\omega\tau_{\max}) & \cdots & \text{sinc}(\omega\tau_{\max}(D-1)) \\ \text{sinc}(\omega\tau_{\max}) & 1 & \cdots & \text{sinc}(\omega\tau_{\max}(D-2)) \\ \vdots & & \ddots & \vdots \\ \text{sinc}(\omega\tau_{\max}(D-1)) & \cdots & \text{sinc}(\omega\tau_{\max}) & 1 \end{bmatrix} \quad (8)$$

Once one has the measurements $(x_l(t), \ldots, x_D(t))_{1 \leq l \leq T}$ of the mixing model, in order to determine the ML estimates of the mixing parameters $(a_l, \tau_l)_{1 \leq l \leq L}$ and the source signals $(s_1(t), \ldots, s_L(t))_{1 \leq l \leq T}$ in the presence of isotropic diffuse noise and, in the "non-square" case, one uses the W-disjoint orthogonality assumption, discussed infra.

2. The W-Disjoint Orthogonal Signal Model

According to the W-Disjoint Orthogonal Signal Model, two signals $s_1$ and $s_2$ are called W-disjoint orthogonal, for a given windowing function W(t), if the supports of the windowed Fourier transforms of $s_1$ and $s_2$ are disjoint, that is:

$$S_1(k,\omega)S_2(k,\omega)=0, \forall k,\omega \quad (9)$$

For L sources $S_1, \ldots, S_L$ the definition generalizes to:

$$S_i(k,\omega)S_j(k,\omega)=0, \forall 1 \leq i \neq j \leq L, \forall k,\omega \quad (10)$$

Equation (9) holds in an approximate sense for real speech signals and a large class of real signals. In addition, equation (9) can be seen as the limit of a stochastic model.

Before deriving the maximum likelihood (ML) estimator two assumptions are made: (1) equation (10) is satisfied for all practical purposes; and (2) noise is Gaussian distributed with zero mean and coherence given by equation (8).

The ML Estimator of Signal and Mixing Parameters

The joint ML estimator of parameters and source signals under equation (10) is now derived.

The source signals naturally partition the time-frequency plane into L disjoint subsets $\Omega_1, \ldots, \Omega_L$, where each source signal is non-zero (i.e., active). Thus, the signals are given by the collection $\Omega_1, \ldots, \Omega_L$ and one complex variable S that defines the active signal:

$$S_l(k,\omega) = S(k,\omega) 1_{\Omega_l}(k,\omega) \quad (11)$$

Let the model parameters $\theta$ consist of the mixing parameters $(\alpha_l, \tau_l), 1 \leq l \leq L$, the partition $(\Omega_l)_{1 \leq l \leq L}$ and S. Based on equations (4) and (6) shown above, its likelihood and maximum log-likelihood estimator are given by:

$$L(\theta) = \prod_{l=1}^{L} \prod_{(k,\omega) \in \Omega_l} \frac{1}{\pi^D \sigma^{2D}} \exp\left\{-\frac{1}{\sigma^2} Y_l^*(k, \omega) \Gamma_n^{-1}(\omega) Y_l(k, \omega)\right\} \quad (12a)$$

$$\hat{\theta}_{ML} = \text{argmin}_\theta \sum_{l=1}^{L} \sum_{(k,\omega) \in \Omega_l} Y_l^*(k, \omega) \Gamma_n^{-1}(\omega) Y_l(k, \omega) \quad (12b)$$

where $Y_l(k, \omega) = X(k, \omega) - Z_l(\omega) S_l(k, \omega)$. As shown by equations (12a and 12b), $L(\theta)$ is the likelihood and $\theta_{ML}$ is the maximum log-likelihood estimator. For any partition $(\Omega_1, \ldots, \Omega_L)$ we define the selection map $\Sigma$: TF-plane→

$\{1, \ldots, L\}$, $\Sigma(k, \omega)=1$ iff $(k, \omega) \in \Omega_l$. $\Sigma$ defines a unique partition. Optimizing over S in equation (12b) one obtains $$\hat{S} = \frac{Z_l^* \Gamma_n^{-1} X}{Z_l^* \Gamma_n^{-1} Z_l} \quad (13)$$

where $l=\Sigma(k, \omega)$. Then denote the mixing parameters $A=(a_l, \tau_l)_{1 \leq l \leq L}$. Inserting equation (13) into equation (12b), the optimization problem reduces to:

$$(\hat{A}, \hat{\Sigma}) = \arg\max_{A, \Sigma} J(A, \Sigma) \quad (14)$$

where:

$$J(A, \Sigma) = \sum_{(k,\omega)} \frac{|Z^*_{\Sigma(k,\omega)} \Gamma_n^{-1} X(k, \omega)|^2}{Z^*_{\Sigma(k,\omega)} \Gamma_n^{-1} Z_{\Sigma(k,\omega)}} \quad (15)$$

The criterion to maximize thus depends on a set of continuous parameters A, and a selection map $\Sigma$ as shown in equation (15). The optimization algorithm for such a criterion works as follows: (1) optimization is performed over the selection map $\Sigma$ (i.e., the partition); and (2) over the continuous parameters A. This procedure is then iterated until the criterion reaches a saturation floor and because the criterion is bounded above, it will converge.

The optimization over the continuous parameters and over the selection map will now be described.

1. Optimal Partition

Given a set of mixing parameters, $A=(a_l, \tau_l)_{1 \leq l \leq L}$, the optimal selection map is given by $$\hat{\Sigma}(k, \omega) = \arg\max_l \frac{|Z^*_{\Sigma(k,\omega)} \Gamma_n^{-1} X(k, \omega)|^2}{Z^*_{\Sigma(k,\omega)} \Gamma_n^{-1} Z_{\Sigma(k,\omega)}} \quad (16)$$

The partition then becomes: $\Omega_l = \{(k, \omega) | \Sigma(k, \omega) = l\}$.

2. Optimal Mixing Parameters

Given a partition $(\Omega_l)_{1 \leq l \leq L}$, the optimal mixing parameters are obtained independently for each l by the following equation:

$$(\hat{a}_l, \hat{\tau}_l) = \arg\max_{a_l, \tau_l} \sum_{(k,\omega) \in \Omega_l} \frac{|Z^*_{\Sigma(k,\omega)} \Gamma_n^{-1} X(k, \omega)|^2}{Z^*_{\Sigma(k,\omega)} \Gamma_n^{-1} Z_{\Sigma(k,\omega)}} \quad (17)$$

It is to be noted that both the denominator and numerator depend on $\omega$, unlike the independent noise case where the numerator is independent of $k$ and $\omega$. Thus, a 2-dimensional optimization procedure is required in order to solve equation (17). In order to compute the optimum mixing parameters a gradient descent is applied to equation (17), discussed hereinafter with regard to FIG. 2.

3. ML Algorithm

Figure 2:
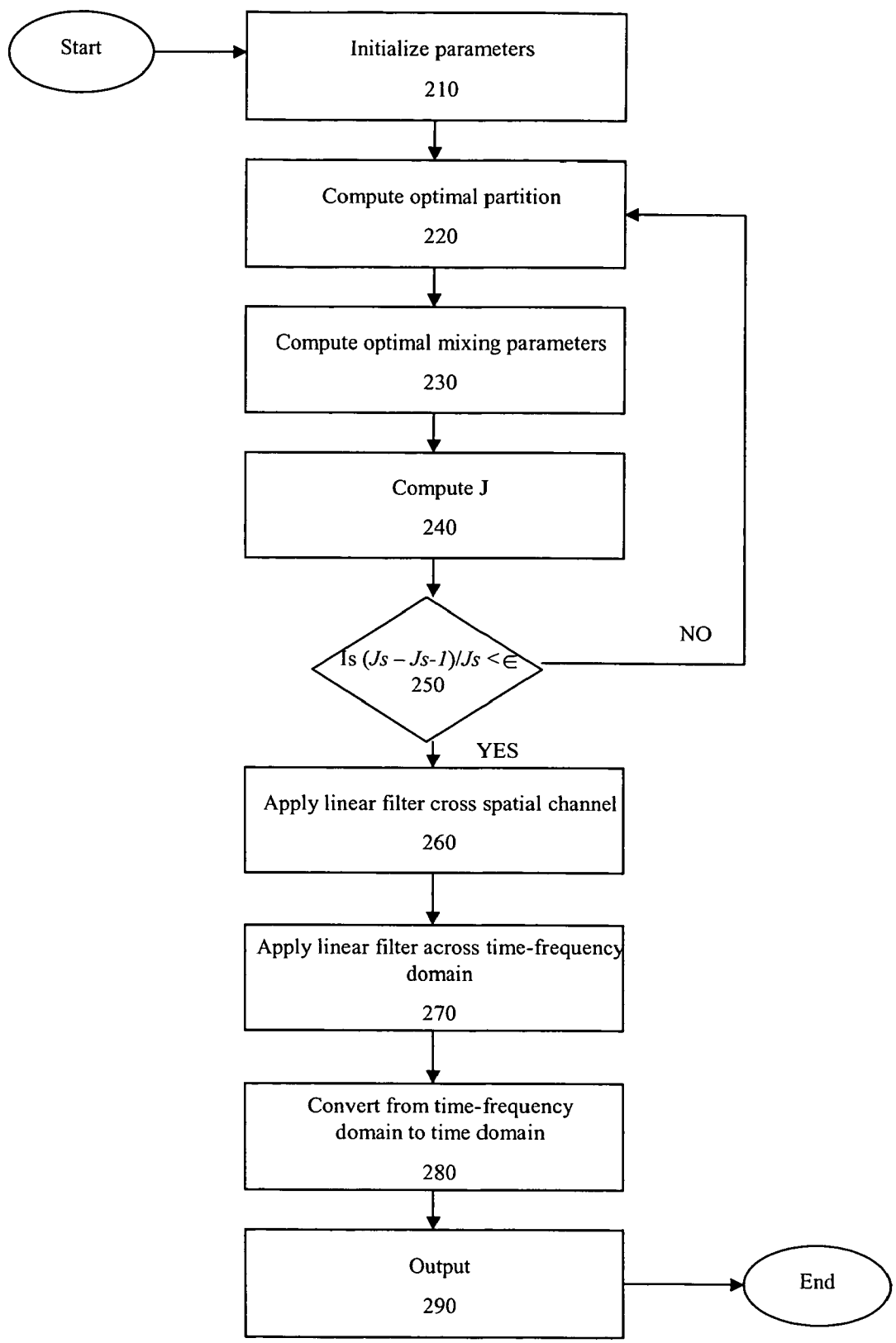
FIG. 2 is a flowchart illustrating an maximum likelihood (ML) algorithm according to an exemplary embodiment of the present invention.

FIG. 2 is a flowchart illustrating an ML algorithm according to an exemplary embodiment of the present invention. As shown in FIG. 2, the mixing parameters $(a_l^0, \tau_l^0)_{1 \leq l \leq L}$ are initialized with random values so that $|a_l^0| < 1$ and $|\tau_l^0| < \Delta$ (step 210). In step 210, variables loop index s and alignment criterion $J^s$ are set=0 and a stopping threshold $\epsilon$ is chosen. This threshold guarantees that the algorithms will stop running in finite amount of time, and controls the degree of approximation to the solution of equation (14). Next, the optimal partition $(\Omega_l^{s+1})_{1 \leq l \leq L}$ and selection map $\Sigma^{s+1}$ are computed by solving equation (16) with the mixing parameters $a_l = a_l^s$ and $\tau_l = \tau_l^s$ (step 220). After the optimal partition and selection map are computed, the optimal mixing parameters are computed by applying a gradient descent to equation (17) until it converges to a local optimum $(a_l^{s+1}, \tau_l^{s+1})$ for each $1 \leq l \leq L$, and subset of time-frequency points $\Omega_l^{s+1}$ (step 230). Subsequently, s is set=s+1 and $J^s = J(A^s, \Sigma^s)$ is computed (step 240). If $(J^s - J^{s-1})/J^s > \epsilon$ the above process is repeated and one goes back to step 220 (step 250). If, however, $(J^s - J^{s-1})/J^s < \epsilon$ the estimated parameters after s iterations become $\alpha_l = \alpha_l^s$, $\tau_l = \tau_l^s$, and $\Omega_l = \Omega_l^s$ and the algorithm proceeds to step 260 (step 250).

As further shown in FIG. 2, once the mixing parameters have been estimated, two independent linear filters are applied thereto. The first linear filter (equation (13)) is applied across the spatial channels and it performs a beamforming in order to reduce the output noise (step 260). The second linear filter (equation (11)) is applied across the time-frequency domain and solves the source separation by selecting the time-frequency points, where by the W-disjoint orthogonality assumption (discussed above) only one source is active (step 270). After step 270, the resulting data is converted from the time-frequency domain into the time-domain (step 280) and it is then output (step 290) to an output 140, for example a loudspeaker, an LCD or CRT display or stored in the memory 120 of a CPU 110, as shown in FIG. 1.

It is to be understood that the ML algorithm described above can be modified such that the computation of optimal mixing parameters in step 230 can be performed before the computation of the optimal partition step 220. In addition, the ML algorithm can be modified to deal with an echoic mixing model or different array configurations at the expense of increased computational complexity. This modification requires knowledge of the number of sources; however, this number is not limited to the number of sensors and, it works in the non-square case, which is the case when the number of sources is bigger or smaller than the number of sensors.

Experimental Results

The ML algorithm discussed above was implemented and applied to realistic synthetic mixtures generated with a ray tracing model. The mixtures consisted of four source signals in different room environments and Gaussian noise. The room size for the experiment was 4×5×3.2 m. Four setups corresponding to anechoic mixing, low echoic (e.g., reverberation time 18 ms), echoic (e.g., reverberation time 130 ms), and strong echoic (e.g., reverberation time 260 ms) were used. The microphones formed a linear array with 2 cm spacing. Source signals were distributed in the room and input signals were sampled at 16 Khz. For time-frequency representation, a Hamming window of 256 samples and 50% overlap was used and coherent noise was added on each channel. The average input signal-to-interference-ratio (SIR) was about −5 dB and, the average individual signal-to-noise ratio (SNR) was 10 dB (i.e., SNR of one source with respect to noise only). Each test was performed three times with independent noise realizations that were filtered to the isotropic diffuse noise coherence.

The optimal mixing parameters (equation (17)) were solved by performing 30 gradient descent steps at each iteration (discussed in step 230). Under the conditions of this experiment, the ML algorithm converged very fast. In at most five iterations it reached 0.1% of the local maximum. In addition, the algorithm converged more often to the true directpath parameters when small noise was added to the diagonal of (matrix (8)). $\Gamma_n$ was chosen as the sum between (matrix (8)) and 0.01 times the identity matrix. The identity matrix is the square matrix whose every entry is=0 except for the diagonal elements which are=1.

In the following discussion the results from the above experiment will be described. In order to compare the results, three separate criteria were used: (1) output average signal to interference ratio gain (SIR gain) (which included other voices and noise); (2) segmental signal to noise ratio (SNR); and (3) signal distortion. The criteria are defined as follows:

$$SIRgain = \frac{1}{N_f} \sum_{k=1}^{N_f} 10\log_{10}(\frac{\|S_o\|^2}{\|\hat{S}-S_o\|^2} \frac{\|X-S_i\|^2}{\|S_i\|^2}) \quad (18)$$

$$segSNR = \frac{1}{N_f} \sum_{k=1}^{N_f} 10\log_{10}\frac{\|S_i\|^2}{\|\hat{S}-S_i\|^2} \quad (19)$$

$$distortion = \frac{1}{N_f} \sum_{k=1}^{N_f} 10\log_{10}\frac{\|S_o-S_i\|^2}{\|S_i\|^2} \quad (20)$$

where: $\hat{S}$ is the estimated signal that contains the $S_0$ contribution of the original signal; X is the mixing at sensor 1, and $S_i$ is the input signal of interest at sensor 1; $N_f$ is the number of frames where the summand is above −10 dB for SIR gain and segmental SNR, and −30 dB for distortion. In this comparison, the summands for SIR gain and segmental SNR computation were saturated at +30 dB and +10 dB for distortion. It is to be understood that SIR gain should be a large positive, whereas distortion should be a large negative.

Figure 3:
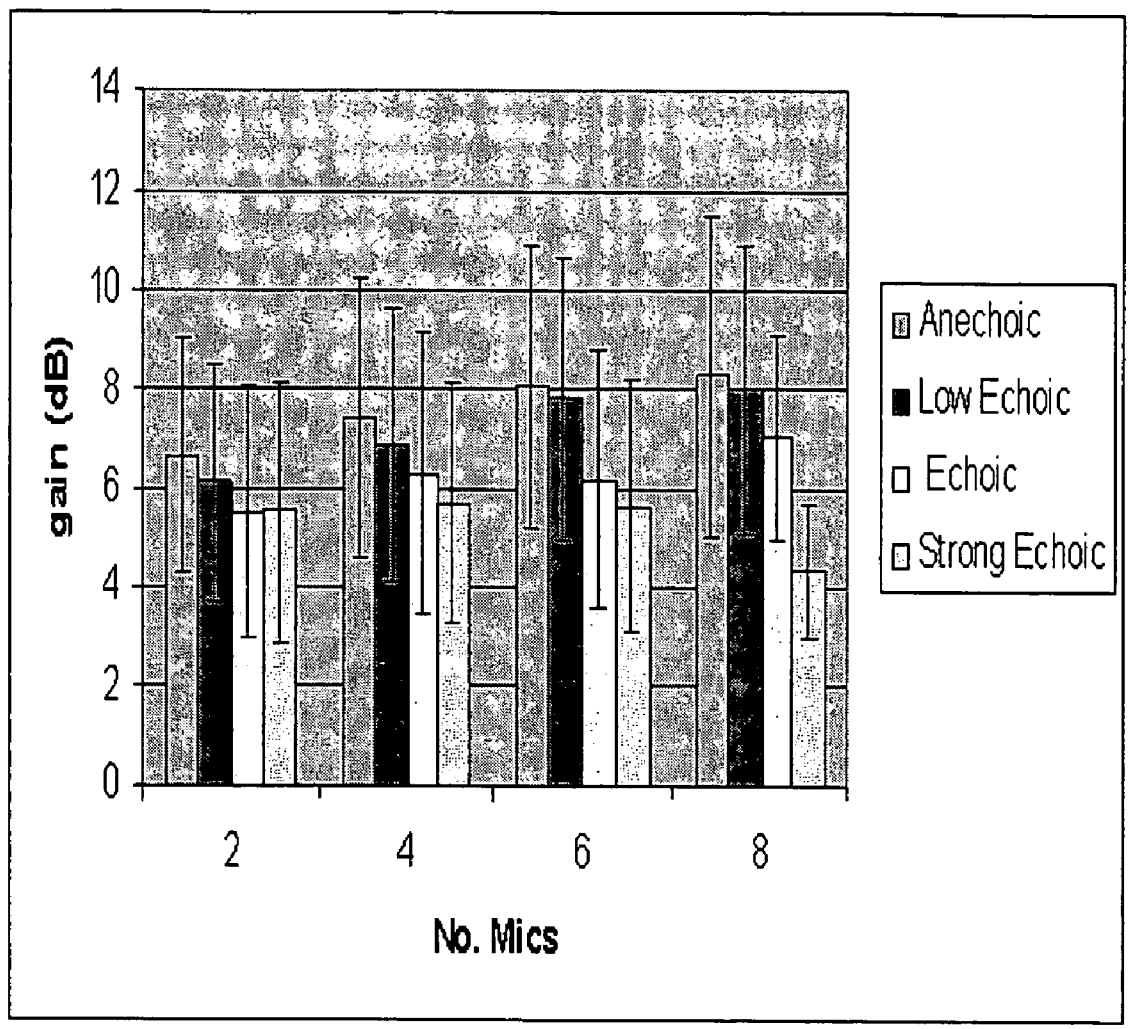
FIG. 3 is a chart illustrating the signal-to-interference-ratio (SIR) gains for 2-8 microphones on four data types according to an exemplary embodiment of the present invention.
Figure 4:
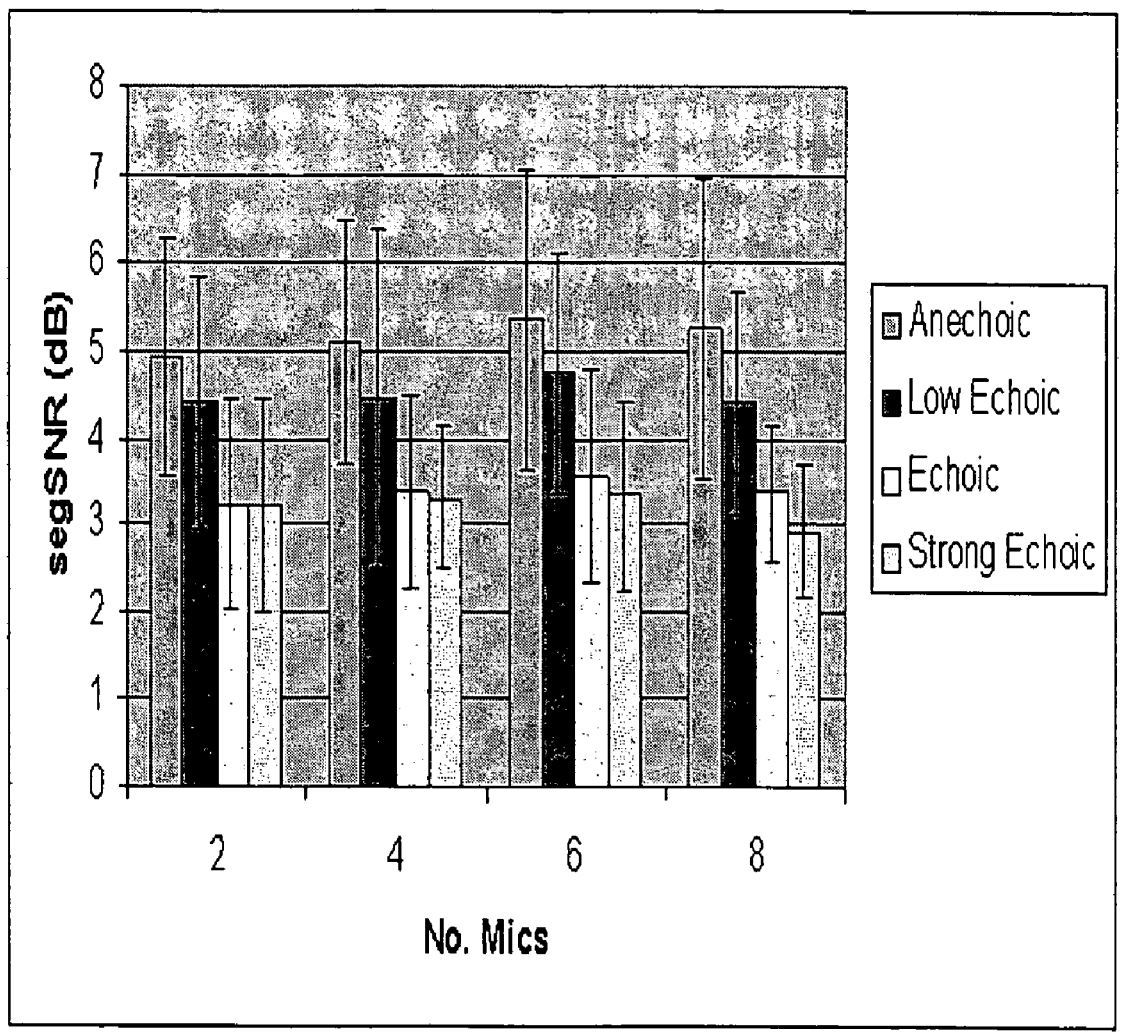
FIG. 4 is a chart illustrating the segmental signal-to-noise-ratios (SNRs) for 2-8 microphones on four data types according to an exemplary embodiment of the present invention.
Figure 5:
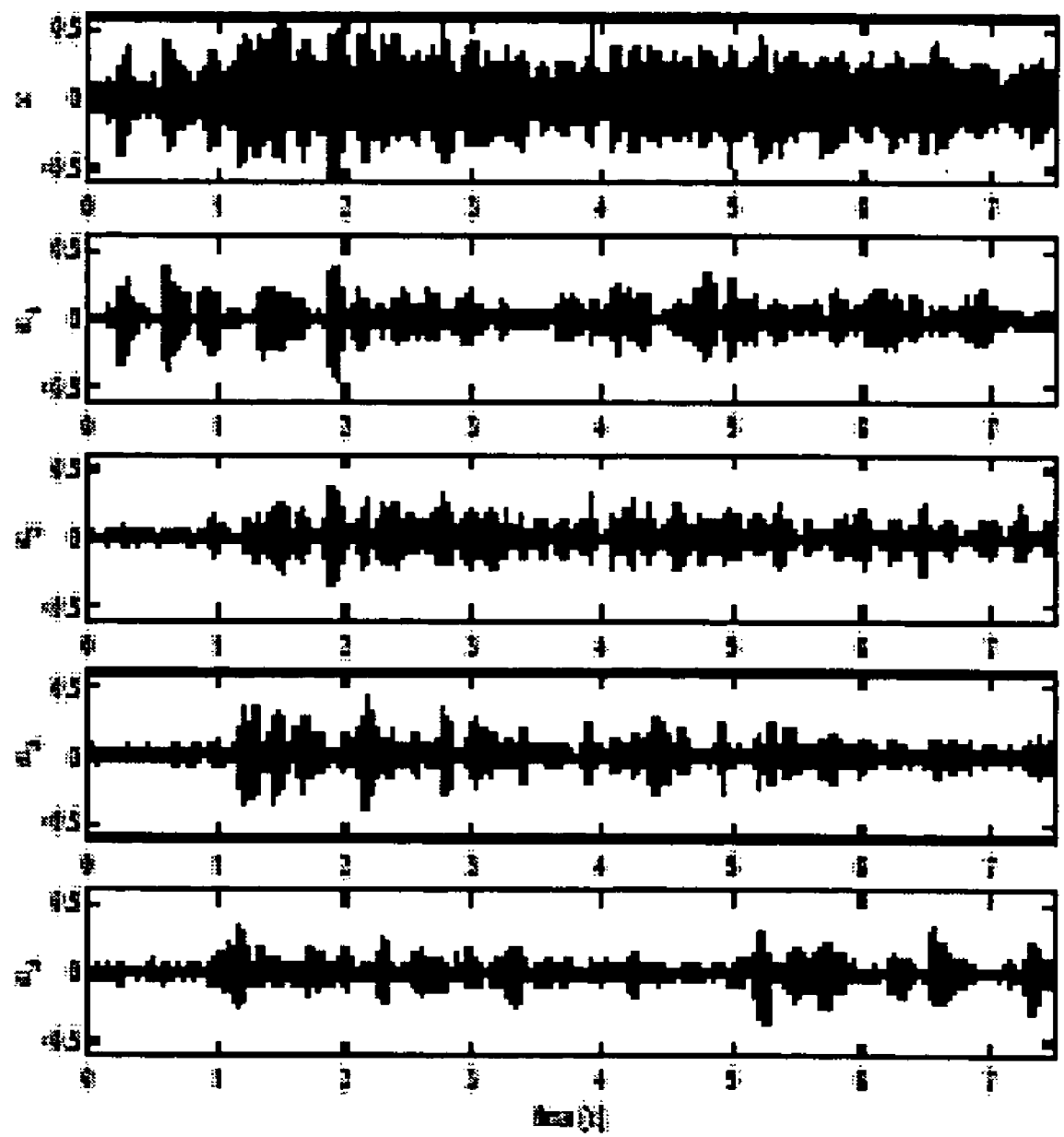
FIG. 5 is a chart illustrating an example of 6-channel algorithmic behavior according to an exemplary embodiment of the present invention.

FIG. 3 illustrates the SIR gains of 2-8 microphones on four data types (i.e., anechoic, low echoic, echoic and strong echoic). As shown in FIG. 3, each bar for the four data types includes one standard deviation bound. FIG. 4 illustrates segmental SNRs for 2-8 microphones on the four data types. As shown in FIG. 4, each bar for the four data types includes one standard deviation bound. FIG. 5 illustrates an example of 6-channel algorithmic behavior on the mixture of coherent noise and four voices (where D=4), with the separated outputs indicated by $s_1$-$s_4$. The distortion values for −5 dB input SIR and 10 dB individual input SNR with the mean (standard deviation) for D number of microphones (i.e., sensors) of the four data types are shown below in Table 1.

TABLE 1

| D | Anechoic | Low Echoic | Echoic | Strong Echoic |
|---|---|---|---|---|
| 2 | −3.98 (1.35) | −3.49 (1.17) | −2.58 (0.92) | −2.61 (1.01) |
| 4 | −4.36 (1.41) | −3.69 (1.53) | −2.79 (0.92) | −2.70 (0.78) |
| 6 | −4.43 (1.68) | −3.74 (1.10) | −2.88 (0.93) | −2.61 (0.85) |
| 8 | −4.36 (1.71) | −3.57 (1.18) | −2.61 (0.73) | −2.01 (0.50) |

A separation of all voices particularly for D≧4 is shown in FIGS. 3-5 and Table 1. As illustrated by FIGS. 3-5 and Table 1, the SIR gains improve with an increase in the number of sensors D. Thus, indicating that separation power of the overall system increases with a noticeable decrease in performance moving from anechoic to echoic data.

It an alternative variant of the present invention other mixing models may be used in place of the above mixing model.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for non-square blind source separation (BSS) under coherent noise, comprising:
   estimating mixing parameters of a mixed source signal;
   first filtering the estimated mixing parameters so that output noise is reduced; and
   second filtering the estimated mixing parameters so that the mixed source signal is separated from the output noise,
   wherein the step of estimating the mixing parameters comprises:
   computing a partition and selection map by using the following equation $$\hat{\Sigma}(k,\omega) = argmax_l \frac{|Z_{\Sigma(k,\omega)}^* \Gamma_n^{-1} X(k,\omega)|^2}{Z_{\Sigma(k,\omega)}^* \Gamma_n^{-1} Z_{\Sigma(k,\omega)}},$$

with $\alpha_l = \alpha_l^s$ and $\tau_l = \tau_l^s$; and
   computing mixing parameters by applying a gradient descent to the following equation $$(\hat{\alpha}_l, \hat{\tau}_l) = argmax_{\alpha_l, \tau_l} \sum_{(k,\omega) \in \Omega_l} \frac{|Z_{\Sigma(k,\omega)}^* \Gamma_n^{-1} X(k,\omega)|^2}{Z_{\Sigma(k,\omega)}^* \Gamma_n^{-1} Z_{\Sigma(k,\omega)}}$$

until it converges to a local optimum $\alpha^{s+1}$, $\tau^{s+1}$ for each $1 \leq l \leq L$ and subset of time-frequency points $\Omega_l^{s+1}$.

2. The method of claim 1, wherein the step of estimating the mixing parameters further comprises:
computing an alignment criterion.

3. The method of claim 2, wherein the alignment criterion are computed by
$J^s = J(A^s, \Sigma^s)$ after setting s=s+1.

4. The method of claim 3, wherein the computation of the alignment criterion is iterated until $(J^s - J^{s-1})/J^s < \in$.

5. The method of claim 1, wherein a first filter is used for the first filtering, the first filter is $$\hat{S} = \frac{Z_l^* \Gamma_n^{-1} X}{Z_l^* \Gamma_n^{-1} Z_l}.$$

6. The method of claim 5, wherein the first filter is applied across spatial channels.

7. The method of claim 5, wherein the first filter performs a beamforming.

8. The method of claim 1, wherein a second filter is used for the second filtering, the second filter is $S_l(k, w) = S(k, w) 1_{\Omega_l}(k, w).$ 9. The method of claim 8, wherein the second filter is applied across the time-frequency domain.

10. The method of claim 8, wherein the second filter performs a time-frequency masking to select time frequency points where only one source is active according to a W-disjoint orthogonality assumption.

11. The method of claim 1, further comprising:
converting filtered data from a time-frequency domain to a time-domain.

12. The method of claim 11, further comprising:
outputting the converted data.

13. A system for non-square blind source separation (BSS) under coherent noise, comprising:
an estimator for estimating mixing parameters of a mixed source signal;
a first filter for filtering the estimated mixing parameters so that output noise is reduced; and
a second filter for filtering the estimated mixing parameters so that the mixed source signal is separated from the output noise,
wherein the mixing parameters are estimated by:
computing a partition and selection man by using the following equation $$\hat{\Sigma}(k, \omega) = argmax_l \frac{|Z^*_{\Sigma(k,\omega)} \Gamma_n^{-1} X(k, \omega)|^2}{Z^*_{\Sigma(k,\omega)} \Gamma_n^{-1} Z_{\Sigma(k,\omega)}},$$

with $\alpha_l = \alpha_l^s$ and $\tau_l = \tau_l^s$; and
computing mixing parameters by applying a gradient descent to the following equation $$(\hat{\alpha}_l, \hat{\tau}_l) = argmax_{\alpha_l, \tau_l} \sum_{(k,\omega) \in \Omega_l} \frac{|Z^*_{\Sigma(k,\omega)} \Gamma_n^{-1} X(k, \omega)|^2}{Z^*_{\Sigma(k,\omega)} \Gamma_n^{-1} Z_{\Sigma(k,\omega)}}$$

until it converges to a local optimum $\alpha_l^{s+1}$, $\tau_l^{s+1}$ for each $1 \leq l \leq L$ and subset of time-frequency points $\Omega_l^{s+1}$.

14. The system of claim 13, wherein the mixing parameters are further estimated by:
computing an alignment criterion by calculating the following
$J^s = J(A^s, \Sigma^s)$.

15. The system of claim 13, wherein the first filter is $$\hat{S} = \frac{Z_l^* \Gamma_n^{-1} X}{Z_l^* \Gamma_n^{-1} Z_l}.$$

16. The system of claim 13, wherein the second filter is $S_l(k, w) = S(k, w) 1_{\Omega_l}(k, w).$ 17. A computer program product comprising a computer useable medium having computer program logic recorded thereon for non-square blind source separation (BSS) under coherent noise, the computer program logic comprising:
program code for estimating mixing parameters of a mixed source signal;
program code for first filtering the estimated mixing parameters so that output noise is reduced; and
program code for second filtering the estimated mixing parameters so that the mixed source signal is separated from the output noises,
wherein the mixing parameters are estimated by:
computing a partition and selection man by using the following equation $$\hat{\Sigma}(k, \omega) = argmax_l \frac{|Z^*_{\Sigma(k,\omega)} \Gamma_n^{-1} X(k, \omega)|^2}{Z^*_{\Sigma(k,\omega)} \Gamma_n^{-1} Z_{\Sigma(k,\omega)}},$$

with $\alpha_l = \alpha_l^s$ and $\tau_l = \tau_l^s$; and
computing mixing parameters by applying a gradient descent to the following equation $$(\hat{\alpha}_l, \hat{\tau}_l) = argmax_{\alpha_l, \tau_l} \sum_{(k,\omega) \in \Omega_l} \frac{|Z^*_{\Sigma(k,\omega)} \Gamma_n^{-1} X(k, \omega)|^2}{Z^*_{\Sigma(k,\omega)} \Gamma_n^{-1} Z_{\Sigma(k,\omega)}}$$

until it converges to a local optimum $\alpha_l^{s+1}$, $\tau_l^{s+1}$ for each $1 \leq l \leq L$ and subset of time-frequency points $\Omega_l^{s+1}$.

18. The computer program product of claim 17, the program code for estimating mixing parameters further comprising:
program code for computing an alignment criterion.

19. The computer program product of claim 18, wherein the alignment criterion are computed by the following
$J^s = J(A^s, \Sigma^s)$ after setting s=s+1.

20. The computer program product of claim 19, wherein the computation of the alignment criterion is iterated until $(J^s - J^{s-1})/J^s < \in$.

21. The computer program product of claim 17, wherein the first filtering is computed by the following $$\hat{S} = \frac{Z_l^* \Gamma_n^{-1} X}{Z_l^* \Gamma_n^{-1} Z_l}.$$

22. The computer program product of claim 17, wherein the second filtering is computed by the following $S_l(k, w) = S(k, w) 1_{\Omega_l}(k, w).$ 23. The system of claim 13, wherein the first filter is applied across spatial channels and performs a beamforming.

24. The system of claim 13, wherein the second filter is applied across the time-frequency domain and performs time-frequency masking to select time frequency points where only one source is active according to a W-disjoint orthogonality assumption.

25. A method for non-square blind source separation (BSS) under coherent noise, comprising:
- initializing mixing parameters with random values;
- setting a source signal and alignment value to zero;
- choosing a stopping threshold;
- computing an optimal partition and selection map by using the following equation $$\hat{\Sigma}(k, \omega) = argmax_l \frac{|Z^*_{\Sigma(k,\omega)} \Gamma_n^{-1} X(k, \omega)|^2}{Z^*_{\Sigma(k,\omega)} \Gamma_n^{-1} Z_{\Sigma(k,\omega)}},$$

with $\alpha_l = \alpha_l^s$ and $\tau_l = \tau_l^s$;

computing the mixing parameters by applying a gradient descent to the following equation $$(\hat{\alpha}_l, \hat{\tau}_l) = argmax_{\alpha_l, \tau_l} \sum_{(k,\omega) \in \Omega_l} \frac{|Z^*_{\Sigma(k,\omega)} \Gamma_n^{-1} X(k, \omega)|^2}{Z^*_{\Sigma(k,\omega)} \Gamma_n^{-1} Z_{\Sigma(k,\omega)}}$$

until it converges to a local optimum $\alpha_l^{s+1}$, $\tau_l^{s+1}$ for each $1 \leq l \leq L$ and subset of time-frequency points $\Omega_l^{s+1}$;

computing an alignment criterion;

first filtering the mixing parameters so that output noise is reduced;

second filtering the mixing parameters so that a mixed source signal is separated from the output noise;

converting filtered data from a time-frequency domain to a time-domain; and outputting the converted data.

* * * * *